Nov. 19, 1963  K. EHRAT  3,111,579
APPARATUS FOR THE DIGITAL CODING OF ANALOGUE QUANTITIES
AS MULTI-PLACE FIGURES IN THE DECIMAL SYSTEM
Filed Dec. 18, 1961  4 Sheets-Sheet 1

Fig. 1

INVENTOR.
Kurt Ehrat
BY
Pierre, Scheffler & Parker
Attorneys

United States Patent Office 3,111,579
Patented Nov. 19, 1963

3,111,579
APPARATUS FOR THE DIGITAL CODING OF ANALOGUE QUANTITIES AS MULTI-PLACE FIGURES IN THE DECIMAL SYSTEM
Kurt Ehrat, Zurich, Switzerland, assignor to Gretag Aktiengesellschaft, Zurich, Switzerland
Filed Dec. 18, 1961, Ser. No. 160,139
Claims priority, application Switzerland Dec. 21, 1960
37 Claims. (Cl. 235—154)

This invention relates to an apparatus for the digital coding of analogue quantities, preferably as multi-place figures in the decimal system.

In such apparatus the analogue quantity to be coded is generally compared in the form of a direct current voltage, designated as the input voltage, with an auxiliary voltage produced in the apparatus. The differential voltage between the input voltage and the auxiliary voltage is used directly, or after conversion into a differential alternating current voltage, with the said control switching means, directly or by means of amplifiers, for controlling step switches which are designated as indicator switching mechanisms and have at least 10 switch positions 0, 1, 2 . . . 9, and which in turn control the magnitude of the auxiliary voltage. An indicator switching mechanism is associated with each decimal place of the multi-place figure to be coded and each indicator switching mechanism controls a voltage fraction of the auxiliary voltage designated as the partial voltage. When the 10 switch positions 0, 1, 2 . . . 9 of the indicator switching mechanism are passed through the partial voltage runs through the 10 ratio values 0, 1, 2 . . . 9, which voltage values together form a so-called voltage decade of the partial voltage and one such partial voltage decade is allocated to each decimal place of the multi-place figure to be coded, the ten absolute values of the partial voltage decade of a determined decimal place being ten times as great as the corresponding ten absolute values of the partial voltage decade of the next lower decimal place. Thus the magnitude of the auxiliary voltage as the sum of all the partial voltages after the control of the indicator switching mechanisms, effected by the differential voltage, becomes practically equal to the input voltage and the differential voltage becomes practically equal to zero, whereby the switch positions of all the indicator switching mechanisms represent the input voltage as a multi-place figure in digital form.

Devices of this type are known under the name of analogue-digital converters, digital voltage indicators, or digital voltmeters. A disadvantage of known arrangements is that the indicator switching mechanisms are not suitable either for direct visual indication or for printing the positions of their switches. The indicator switching mechanisms are usually stepped switching mechanisms running in one direction only, and the digital coding of an analogue quantity is effected for example as follows: It will be assumed for example that the analogue quantity as input voltage has in digital form the value 635 and that one indicator switching mechanism is available for each of the three decimal places. The three indicator switching mechanisms are first adjusted to the switch position 9, that is to say corresponding to the three place figure 999. With the partial voltage decades of the two lower decimal places short-circuited the indicator switching mechanism of the highest decimal places is thereupon turned back from switch position to switch position, starting from the switch position 9 which with the partial voltage decades of the two lower decimal places short-circuited corresponds to the auxiliary voltage value 900, until the auxiliary voltage is for the first time below the value of the input voltage and alters the polarity of the difference voltage. This will be the case when the indicator switching mechanism of the highest decimal place stands at switch position 6 and the auxiliary voltage value thus amounts to 600. (900, 800, 700 are larger, but 600 is smaller than 635.) Thereupon only the partial voltage of the lowest decimal place is short-circuited and the indicator switching mechanism of the middle decimal place is turned back from the switch position 9, whereby the auxiliary voltage varies step by step through the values 690, 680, 670, 660, and so on. This indicator switching mechanism is in turn turned back until the auxiliary voltage is for the first time below the input voltage and changes the polarity of the differential voltage. This will be the case when the indicator switching mechanism of this middle decimal place stands at 3. (690, 680, 670, 660, 650, 640 are larger but 630 is smaller than 635.) The short-circuiting of the partial voltage of the lowest decimal place is thereupon also eliminated and the indicator switching mechanism of the lowest decimal place is adjusted according to the same rule, so that finally the value 635 of the input voltage appears as the three switch positions 6, 3, and 5 of the three indicator switching mechanisms. Since the input voltage can vary more quickly or more slowly, the procedure described must be carried out periodically. The indicator switching mechanisms are set to 9 at short intervals of time of for example one second by a clock, whereupon one switching mechanism after the other, beginning with the highest decimal place, is set to the voltage value in the described manner and after one second placed at 9 again. The disadvantages of this type of device can easily be seen. Even if the input voltage varies only very little or not at all, the indicator switching mechanisms of all decimal places must be periodically re-adjusted time after time in rhythm with the clock. The wear on the step switching mechanisms thus becomes unnecessarily great, while in addition, in consequence of the continual switching of the indicator switching mechanisms, direct reading of the switch positions on the indicator switching mechanisms themselves becomes very difficult and separate indicator devices with storage means become necessary which take over the switch position values of the indicator switching mechanisms at a determined moment and store them so that indication persists during the switching of the indicator switching mechanisms until the next transfer. Moreover, the indicator devices with the storage means and the clock are expensive.

The figures obtained in the apparatus are generally printed in order to record them, and this necessitates the use of special printing mechanisms, which are remote-controlled by the switch positions of the indicator switch mechanisms, while the expense involved in providing such printing mechanisms and their remote control is extremely great. It is an object of the present invention to overcome these disadvantages. In the apparatus according to the invention the switch positions can be read and printed direct from the indicator switching mechanisms and a special indicator device with storage means and a special remote-controlled printing mechanism is not required. In addition, a clock is not necessary and with a constant input voltage the indicator switching mechanisms stop in the switch position corresponding to the input voltage and as the input voltage varies only the indicator switching mechanisms of that decimal place which makes it obligatory vary their switch position.

According to the present invention there is provided apparatus for the digital coding of analogue quantities as multi-place figures in the decimal system, comprising a plurality of electromagnetic decade indicator switching mechanisms, one for each place of the multi-place figure, an indicating rotor to each indicator switching mechanism, a forward running electromagnet to each indicator switching mechanism, means operable by said electromagnet to drive its respective rotor in a forward direction, a reverse running electromagnet to each indicator switching mechanism, means operable by said reverse running electromagnet to drive its respective rotor in the reverse direction, a partial voltage resistance decade to each indicator switching mechanism, each such resistance decade comprising a decade of resistances each provided with a switch contact, the ten absolute values of the resistances of the partial voltage resistance decade of the indicator switching mechanism allocated to one decimal place being ten times as great as the corresponding ten absolute values of the resistances of the partial voltage resistance decade of the indicator switching mechanism allocated to the next lower decimal place, a decade switch to each indicator switching mechanism and operable to contact a switch contact of the resistance decade, tens transfer contacts to each indicator switching mechanism, means operable by the rotor of each indicator switching mechanism to operate the tens transfer contacts associated therewith, a position selector switching mechanism, a rotor to said position selector switching mechanism, a forward running electromagnet to said position selector switching mechanism means operable by the latter electromagnet to drive the rotor in a forward direction, a reverse running electromagnet to said position selector switching mechanism, means operable by the latter electromagnet to drive the rotor in a reverse direction, a position switch operable by the rotor of said position selector switching mechanism, a source of indicator impulses, line means connecting said position switch to each of said indicator switching mechanisms whereby said indicator impulses can be fed to any one of said indicator switching mechanisms, a source of position selector impulses, amplitude-sensitive switching means operatively controlling the electromagnets of the position selector switching mechanism to permit position selector impulses to be fed to said electromagnets, a constant limit voltage source associated with said amplitude-sensitive switching means, a source for the analogue quantity to be compared in the form of a direct current input voltage source, a source of direct current, means connecting said direct current source through the operative resistances of the resistance decades of all the indicator switching mechanisms so as to generate an auxiliary voltage, means for generating a differential voltage between said input voltage and said auxiliary voltage produced in the apparatus, a voltage divider switch operable by the rotor of said position selector switching mechanism, line means feeding the differential voltage to one side of said voltage divider switch, and polarity-sensitive switching means connected between the other side of said voltage divider switch and the electromagnets of the indicator switching mechanisms to feed indication impulses to said electromagnets to operate the latter, the arrangement being such that the differential voltage is used to control the indicator switching mechanisms each of which controls a voltage fraction of the auxiliary voltage in a manner such that the magnitude of the auxiliary voltage as the sum of all the partial voltages after the control of the indicator switching mechanisms, effected by the differential voltage, becomes practically equal to the input voltage and the differential voltage becomes practically equal to zero, whereby the switch positions of all the indicator switching mechanisms represent the input voltage as a multi-place figure in digital form, and being such that the indicator switching mechanisms are controlled through the differential voltage owing to the fact that in each case indicator impulses are supplied to an indicator switching mechanism selected by means of the position switch of the position selector switching mechanism, these indicator impulses being controlled by the differential voltage with the said of the polarity-sensitive switching means in such a manner that, depending on the polarity of the differential voltage, they energise the appropriate electromagnet of the respective indicator switching mechanism and thus drive the indicator switching mechanism rotor in the one direction depending on the polarity of the differential voltage, while in addition this selected indicator switching mechanism together with indicator switching mechanisms of all higher decimal places form a decade impulse meter running forwards and backwards, in which the tens transfers of the lower to the next higher decimal places are effected by the tens transfer contacts operated by the indicator switching mechanism rotor, while the switching of the position selector switching mechanism rotor by one step in the forward direction feeds the indication impulses through the switching-over of the position switch to the indicator switching mechanism of the next higher decimal place, and the switching of the rotor by one step in the reverse direction feeds the indication impulses through the switching-over of the position switch to the indicator switching mechanism of the next lower decimal place, the switching of the position selector switching mechanism rotor in the appropriate direction in dependence upon the amplitude of the differential voltage being controlled by the position selector impulses with the aid of the amplitude-sensitive switching means in such a manner that, when the amplitude of the differential voltage of a top voltage limit is exceeded, at least one position selector impulse reaches the forward running magnet of the position selector switching mechanism and switches the latter in the forward direction and through the position switch switches over the feeding of the indication impulses from the indicator switching mechanism of one decimal place to the indicator switching mechanism of the next higher decimal place, and that, when the differential voltage falls below a lower voltage limit, at least one position selector impulse reaches the reverse running magnet of the position selector switching mechanism and switches the same in the reverse direction, and through the position switch switches over the feeding of the indication impulses from the indicator switching mechanism of one decimal place to that of the next lower decimal place.

In one particularly advantageous form of construction the differential voltage is converted by a vibrator, controlled by the lighting mains alternating current, into a differential alternating current voltage, and the indication impulses and position selector impulses are obtained direct from the lighting mains by one-way rectification, thus resulting in a particularly simple construction for the apparatus, while the direct current feeding voltage source of the apparatus is not loaded by the drive of the indicator switching mechanisms and of the position selector switching mechanism. In addition, it is desirable that the indicator switching mechanisms are provided with indicator figure rollers and printing figure rollers fastened or mechanically connected to the indicator switching mechanism rotor, the said rollers indicating the switch positions by the figures 0 to 9. The indicator switching mechanisms preferably have a small dimension transversely to these figures and the indicator switching mechanisms are disposed spatially side-by-side in such a manner that their switch positions, indicated with the aid of the indicator figure rollers, are together visible as multi-place figures and the figures of the printing figure rollers of all indicator switching mechanisms can together be printed as multi-place figures.

In order to enable the invention to be more readily understood, reference will now be made to the accompanying drawings, which illustrate diagrammatically and by way of example an embodiment thereof, and in which.

Figure 1:
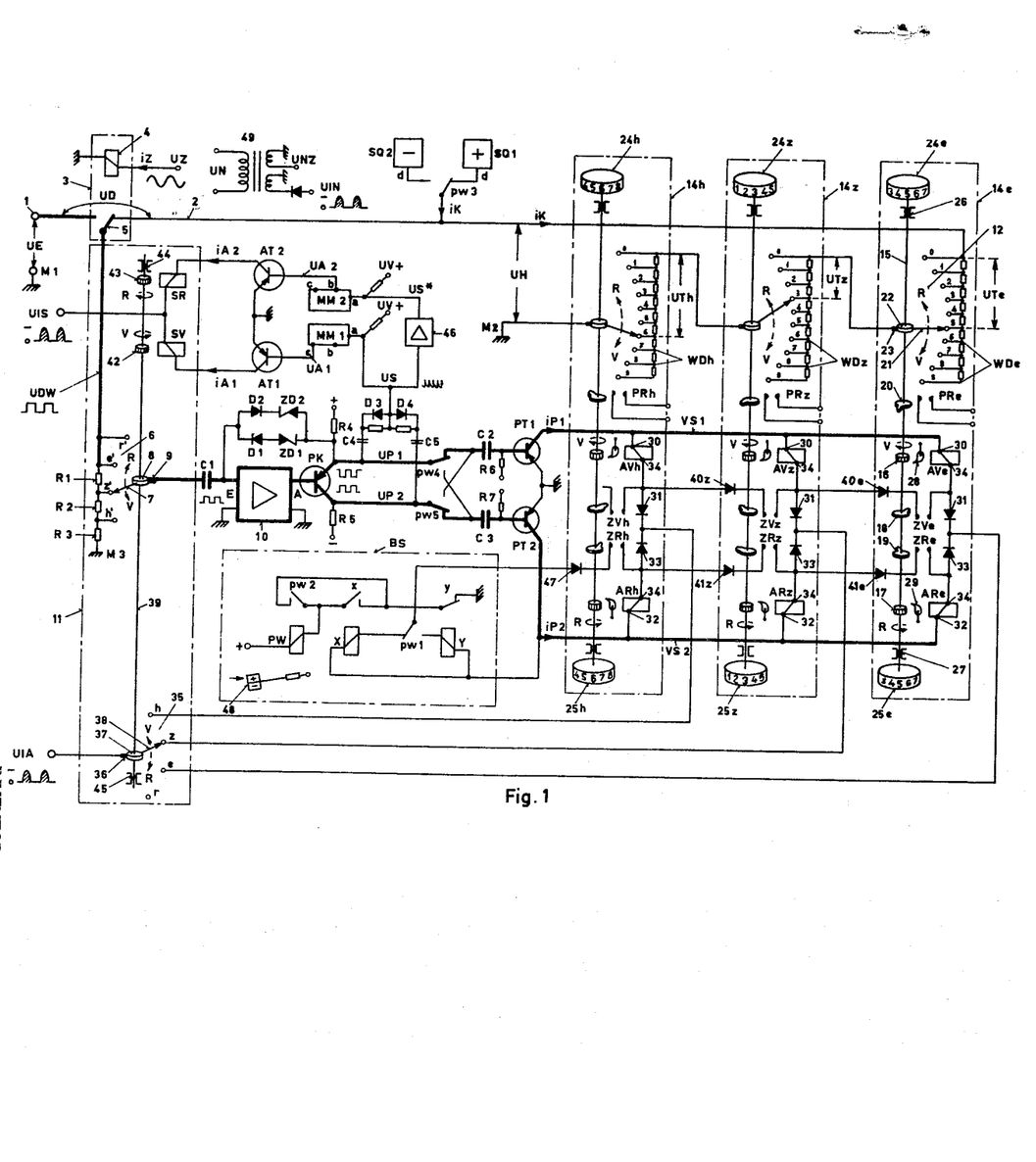
FIGURE 1 is a wiring diagram of an apparatus for the digital coding of analogue quantities as multi-place figures in the decimal system.

Referring now to the drawings, the input voltage UE, which is to be coded in digital form, is introduced into the apparatus at the terminals 1 and M1 and is compared with an auxiliary voltage UH, which is impressed between a circuit line 2 and a point M2. The voltage difference between the input voltage UE and the auxiliary voltage UH is a differential voltage UD, which with the aid of a vibrator 3 is converted into a differential alternating voltage UDW of rectangular wave form. The vibrator 3 consists of a driver coil 4, which is fed by a vibrator alternating current iZ, and a vibrator contact 5, which switches over with the frequency of the vibrator alternating current between the voltages UE and UH. The differential alternating voltage UDW passes through a multi-stage voltage divider containing resistances R1, R2, and R3 connected to an earth point M3, through the slidable switch arm 7 of a voltage divider switch 6, to a slip-ring 8 and a slip-ring brush 9, and finally through a capacitor C1 to the input E of an amplifier 10. The circuit points M1, M2, and M3 could also be connected together without, as shown in FIGURE 1, being connected to earth. In addition to the differential alternating current voltage UDW, a direct current voltage component, which however is held back by the capacitor C1, is also applied to the voltage divider.

The multi-stage voltage divider has switch contacts e', z', h' and r', and is a component of a position selector switching mechanism 11 which is arranged to control the voltage divider switch 6. The switch arm 7 and the slip-ring 8 are fixed on the rotor shaft 39 of the position selector switching mechanism 11.

The amplifier 10 may be a transistor or a valve amplifier, the degree of amplification of which is made approximately constant by internal negative feed-back (not shown in FIGURE 1). A transistor PK is connected as a phase reversal stage to the output A of the amplifier 10, the output A being connected to the base of the transistor the emitter and collector of which are connected through resistances R4 and R5 of equal magnitude to the positive and negative feed voltages, so that amplified differential alternating current voltages UP1 on the emitter and UP2 on the collector are of equal magnitude but of opposite phase, that is to say displaced in phase by 180° in relation to one another. Instead of the transistor PK, valves or other means could also be used as the phase reversal stage.

The amplified differential alternating current voltages UP1 and UP2 pass through contacts pw4 and pw5 and through capacitors C2 and C3 to transistors PT1 and PT2 acting as AND-gate circuits. The transistor PT1 is here designated as the first polarity gate and the transistor PT2 the second polarity gate. A direct current potential is fed to the base of each transistor through resistances R6 and R7. The collector current iP1 is controlled in the first polarity gate PT1 and flows only when at the same time the base and the collector are negative in relation to the emitter. The collector current iP2 is controlled in the second polarity gate PT2 and flows if at the same time the base and the collector of the transistor PT2 are negative in relation to the emitter. The currents iP1 and iP2 are impulse currents, the impulses of which are designated as indication impulses and serve to control step switch mechanisms 14e, 14z, and 14h designated as indicator switching mechanisms. These indicator switching mechanisms effect the digital coding and indication of the input voltage UE, introduced as an analogue magnitude, as a multi-place decimal figure, in this example as a three-place decimal figure. The lowest place of the decimal figure, the so-called units decimal place, is associated with the indicator switching mechanism 14e, the next higher or tens decimal place is associated with the indicator switching mechanism 14z, and the highest or hundreds decimal place is associated with the indicator switching mechanism 14h. The construction and mode of operation of indicator switching mechanisms of this type is described for example in my copending application Serial No. 151,390, filed November 9, 1961.

In the wiring diagram shown in FIGURE 1 the mechanical construction of the indicator switching mechanisms is illustrated in highly diagrammatic form. Of the three identical indicator switching mechanisms, that designated by 14e will be briefly described. The indicator switching mechanism comprises a rotor shaft 15 rotatably mounted in bearings 26 and 27, ratchet wheels 16 and 17 fastened thereon, for the drive in the forward and reverse directions, switch cams 18 and 19 for operating tens transfer contacts ZVe for forward running and ZRe for reverse running, and a switch cam 20 for operating a programme contact PRe. In practice however a plurality of switch cams 20 and programme contacts PRe are generally provided, which together can furnish a switch programme as a function of the rotor rotation. A rotating switch arm 21 and a slip-ring 22 are also fastened on the rotor shaft and serve to control a resistance decade WDe through switch contacts numbered 0 to 9, and able to assume the ten different switch positions 0, 1, 2, . . . 9 on rotation of the rotor shaft. The rotating switch arm 21 together with the switch contacts 0 to 9 form a decade switch 12. The voltage between the switch position selected by the switch arm (in FIGURE 1 the switch position 5) and the switch position 0 is the partial voltage UTe, which is colllected by a brush 23. The representation of the decade switch 12 in FIGURE 1 is to be understood as meaning that the switch positions 0 to 9 form a closed circuit and the switch arm passes from the switch position 9 to the switch position 0 on moving one step in the forward direction.

The construction of the decade switch 12 with the rotating switch arm 21, slip-ring 22, and slip-ring brush 23, as illustrated here, can also be replaced by a cam contact arrangement such as that described, for example, in my copending application Serial No. 151,390, filed November 9, 1961, while of ten cam contacts in each of the ten switch positions one in each case is closed and the switch cams operating the cam contacts are fastened on the rotor shaft. A decade indicator figure roller 24e is also fastened on the rotor shaft, and has ten figures 0, 1, 2, . . . 9 of which one (namely that corresponding to the switch position—the figure 5 in the case of FIGURE 1) always appears in a viewing aperture (not shown), thereby indicating the switch position. The three-place decimal figure indicated by the three indicator figure rollers 24e, 24z and 24h of the three indicator switching mechanisms together (in FIGURE 1 the figure 635) is the indication of the analogue quantity (i.e. the input voltage UE) in digital form.

In addition, a printing figure roller 25e is fastened on the rotor shaft, and the ten decimal figures are disposed in relief on its periphery in a known manner suitable for printing. The figures of the printing figure rollers naturally correspond to those of the indicator figure rollers, while the three-place decimal figure printed by the three figure rollers 25e, 25z, 25h together (in FIGURE 1 the figure 635) prints the analogue quantity in digital form. It is obvious that the dimension of the indicator switching mechanism transversely to the figures of the figure rollers must be small, in order that the indicator switching mechanisms can be disposed spatially side-by-side in such a manner that the total figure, indicated by all the indicator figure rollers together, and the total figure printed by all the printing figure rollers together can easily be read as multi-place figures. For this reason, the aforesaid electromagnetic step switching mechanisms are particularly suitable as indicator switching mechanisms.

The rotor of the indicator switching mechanism can be turned step-by-step in the forward direction (shown by the arrow V) by impulse-like energisation of a forward running magnet AV$e$ by means of a switch pawl 28 (shown diagrammatically in the drawings) which is operated by the magnet armature and which acts on the ratchet wheel 16. In addition, the rotor can be turned step-by-step in the reverse direction (shown by the arrow R) by impulse-like energisation of a reverse running magnet AR$e$ by means of a pawl 29 which is operated by the magnet armature and which acts on the ratchet wheel 17. The impulses for the impulse-like energisation of the forward running and reverse running magnets of the indicator switching mechanisms are the indicator impulses which are marked by the current arrows $iP1$ and $iP2$ and which are controlled by the polarity gates PT1 and PT2 and fed through a position switch 35 of the position selector switching mechanism 11.

The first current supply terminal 30 of a forward running magnet is connected to the corresponding current supply terminals 30 of the other forward running magnets of the indicator switching mechanisms, and they are all connected to the first polarity gate PT1 by a distributor bar VS1. The first current supply terminal 32 of a reverse running magnet is connected to the corresponding current supply terminals 32 of the other reverse running magnets of the indicator switching mechanisms and they are all connected to the second polarity gate PT2 by a distributor bar VS2. The second current supply terminal 34 of the forward running magnet of an indicator switching mechanism is connected through a rectifier 31 to a switch contact of the position switch 35 controlled by the position selector switching mechanism 11 and the second current supply terminal 34 of the reverse running magnet of the same indicator switching mechanism is connected through a rectifier 33 to the same switch contact of the position switch, and the corresponding second current supply terminals of the forward running and reverse running magnets of every other indicator switching mechanism likewise being connected through rectifiers 31 and 33 each to another switch contact of the position switch 35.

The indication impulses are fed through switch contacts $e$, $z$ and $h$ of the position switch 35 to the indicator switching mechanisms, while the feed voltage for the indicator impulses is the impulse voltage UIA which is fed through a brush 36 to a slip-ring 37 and a switch arm 38 capable of making contact with the contacts $e$, $z$ and $h$. The switch arm 38 and the slip-ring 37 are fixed on the rotor shaft 39 of the position selector switching mechanism 11. The indicator impulses are fed through the switch arm simultaneously in each case at most to one of the three indicator switching mechanisms, namely to the indicator switching mechanism 14$h$ when the switch arm stands at the switch contact $h$, to the indicator switching mechanism 14$z$ when the switch arm stands at the switch contact $z$, and to the indicator switching mechanism 14$e$ when the switch arm stands at the switch contact $e$. When the switch arm 38 stands at a switch contact $r$ of the switch 35 (the so-called rest position), the indication impulses pass to none of the indicator switching mechanisms, and the latter are at rest.

The indicator switching mechanism selected by the position switch 35 of the position selector switching mechanism and fed with indication impulses forms, together with the indicator switching mechanisms of all higher decimal places, a forward and reverse running decade impulse counting mechanism, in which the tens transfers of the lower to the next higher decimal places are effected through the tens transfer contacts, for example ZV$e$ or ZR$e$, operated by the switch cams 18 or 19 of the indicator switching mechanism rotors. The tens transfer contacts ZV$e$, ZV$z$, and ZV$h$ are closed only in the switch positions 9 of their appertaining indicator switching mechanisms and serve for the tens transfer when running in the forward direction. The tens transfer contacts ZR$e$, ZR$z$, and ZR$h$ are closed only in the switch positions 0 of their appertaining indicator switching mechanisms and serve for the tens transfer when running in the reverse direction.

The rectifiers 33 prevent the running in the forward direction from being influenced by the tens transfer contacts ZR$e$, ZR$z$, ZR$h$ for the reverse direction, and the rectifiers 31 prevent the running in the reverse direction from being influenced by the tens transfer contacts ZV$e$, ZV$z$, ZV$h$ for the forward direction.

The tens transfer contacts for the forward direction of a determined indicator switching mechanism (for example ZV$e$) are arranged to connect the second current supply terminal 34 of the forward running magnet of the same indicator switching mechanism to the second current supply terminal 34 of the forward running magnet of the indicator switching mechanism of the next higher decimal place through a rectifier 40$e$.

The tens transfer contacts for the reverse direction of a determined indicator switching mechanism (for example ZR$e$) are arranged to connect the second current supply terminal 34 of the reverse running magnet of the same indicator switching mechanism to the second current supply terminal 34 of the reverse running magnet of the indicator switching mechanism of the next higher decimal place through a rectifier 41$e$.

The mode of operation of the forward and reverse running decade impulse meter formed by the indicator switching mechanisms can easily be seen with the aid of the example illustrated in FIGURE 1.

The feed voltage UIA of the indication impulses is an impulse voltage negative to earth. The voltage is negative to earth for the reason that in the example illustrated in FIGURE 1 p-n-p transistors are used as polarity gates, the emitters of which are connected to earth. In the position illustrated in FIGURE 1 of the position switch 35 controlled by the position selector switching mechanism 11, in which the switch arm 38 stands on the switch contact $z$ the indication impulses are fed to the indicator switching mechanism 14$z$ corresponding to the tens decimal position. This now forms, together with the indicator switching mechanism 14$h$ (as the only indicator switching mechanism of the higher decimal places in the example) the forward and reverse running decade impulse meter. When the first polarity gate PT1 is open, the forward running magnet AV$z$ of the selected indicator switching mechanism 14$z$ is impulse-energised by the indication impulses and the indicator switching mechanism rotor is driven in the forward direction V. The reverse running rotor remains unenergised and the second polarity gate PT2 remains closed.

When the rotor of the indicator switching mechanism 14$z$ reaches the switch position 9, the tens transfer contacts ZV$z$ are closed. The following indication impulse will energise not only the forward running magnet AV$z$ through the contact ZV$z$ and the rectifier 40$z$, but also the forward running magnet AV$h$ of the next higher indicator switching mechanism 14$h$. The rotor of the indicator switching mechanism 14$z$ is thereby displaced from the switch position 9 to the switch position 0, and the rotor of the indicator switching mechanism 14$h$ is turned one step in the forward direction, whereby the tens transfer is effected.

Through the rectifier 40$e$, energisation of the magnet AV$e$ (which belongs to the indicator switching mechanism of the next lower decimal place) is prevented even when the contact ZV$e$ is closed.

If on the other hand the polarity gate PT1 is closed and PT2 is open, the indication impulses energise the reverse running magnet AR$z$, which drives the rotor of the indicator switching mechanism in the reverse direction R. The tens transfer then takes place when the rotor reaches the switch position 0 and the contacts ZRz are closed, while through the next indication impulse the rotor of 14z is turned back into the switch position 9 and through the contacts ZRz and the rectifier 41z the rotor of the indicator switching mechanism 14h is turned back one step, the rectifier 41e preventing energisation of the reverse running magnet ARe appertaining to the lower position indicator switching mechanism.

The described type of tens transfer is made possible owing to the fact that the switching of the indicator switching mechanism rotor takes place in the current-less phase of the indication impulses through the dropping movement of the magnet armatures of the forward running and reverse running magnets, for example through the action of an armature spring. In the current phase of the indiaction impulses, in which the magnet armature is attracted and for example an armature spring is stressed, the contact positions remain unchanged, so that undisturbed energisation of a magnet is possible through the tens transfer contact.

The resistance decade WDe of the indicator switching mechanism 14e consists of ten serially connected resistances of the same value, for example 1 ohm each, and which are traversed by a constant current iK, for example 10 ma. The voltages through the ten resistances together form a partial voltage decade and the voltage taken by the switch arm 21 of the decade switch 12 is the partial voltage UTe, which in the switch position 5 illustrated amounts for example to 5 ohms x 10 ma., equals 50 mv., equals 0.05 v.

The resistance decade WDz of the next higher indicator switching mechanism 14z likewise consists of ten serially connected resistances of equal value, but which are ten times as great as those of the indicator switching mechanism 14e, i.e. for example 10 ohms each. These resistances are traversed by the same current iK, and the voltages through the resistances form again a partial voltage decade, while the voltage taken by the switch arm constitutes the partial voltage UTz, which for the switch position 3 illustrated amounts for example to 30 ohms x 10 ma. equals 0.3 v.

The resistance values of the resistance decade WDh of the indicator switching mechanism 14h for the next higher decimal place are again ten times as great, i.e. for example 100 ohms each, so that the partial voltage UTh for the switch position 6 illustrated amounts for example to 600 ohms x 10 ma., equals 6 v.

All the partial voltages are connected in series and together yield the auxiliary voltage UH, which is thus equal to UTe+UTz+UTh and in the example amounts to 6.35 v. Since each switch position is indicated by the figure roller of the respective indicator switching mechanism, the figure 6.35 is indicated in the example by the three figure rollers of the three indicator switching mechanisms together, if the decimal point is inserted artificially.

If the auxiliary voltage UH is regulated by the indicator switching mechanisms in such a manner that it becomes practically equal to the input voltage UE and the differential voltage UD becomes practically equal to zero, the figure indicated by the indicator switching mechanisms represents the input voltage in digital form. This regulation of the auxiliary voltage to equality with the input voltage is effected fully automatically by the polarity and by the amplitude of the differential alternating current voltage.

The regulation of the auxiliary voltage through the polarity of the differential alternating current voltage will now be explained with reference to the example illustrated in FIGURE 1. If the input voltage UE is smaller than the auxiliary voltage UH, the differential voltage UD has a determined polarity, and for this polarity the auxiliary voltage UH must be reduced, that is to say the indicator switching mechanisms must be driven in the reverse direction. If on the other hand the input voltage is greater than the auxiliary voltage, the differential voltage has the other polarity, and for this other polarity the auxiliary voltage must be increased, that is to say the indicator switching mechanisms must be driven in the forward direction. Polarity-sensitive switching means are therefore necessary, by means of which the drive of the indicator switching mechanisms is so controlled that it takes place in the forward direction for one polarity of the differential voltage and in the reverse direction for the other polarity. Since the differential voltage may be very small and a direct current amplifier is unsuitable for small signals, in the example of performance of the invention illustrated in FIGURE 1 the differential voltage UD is converted, as mentioned, by means of the vibrator 3 into the differential alternating current voltage UDW which has the frequency of the vibrator alternating current iZ and which is amplified in the alternating current amplifier 10, whereby either the resulting amplified differential alternating current voltage UP1 is applied to the polarity gate PT1, or the resulting amplified differential alternating current voltage UP2, which is oppsite in phase to UP1, is applied to the polarity gate PT2.

The impulse frequency of the indication impulses which are fed as the impulse voltage UIA is selected in this example to be equal to the frequency of the vibrator alternating current, whereby the impulse frequency of the indication impulses is also made equal to the frequency of the differential alternating current voltage.

The phase position is so selected that the indication impulses at the one polarity gate are in phase with the amplified differential alternating current voltage and at the other polarity gate are opposite in phase. It is obvious that for the one polarity of the differential voltage only the one polarity gate can be passed by the indication impulses, and the indicator switching mechanisms are driven in the one direction of running, and that for the other polarity of the differential voltage, with which the phases of UP1 and UP2 are reversed, only the other polarity gate can be passed by the indication impulses and the indication switching mechanisms are driven in the other direction of running. The polarity gates as phase-comparing switching means here take over the tasks of the polarity-sensitive switching means.

Figure 4:
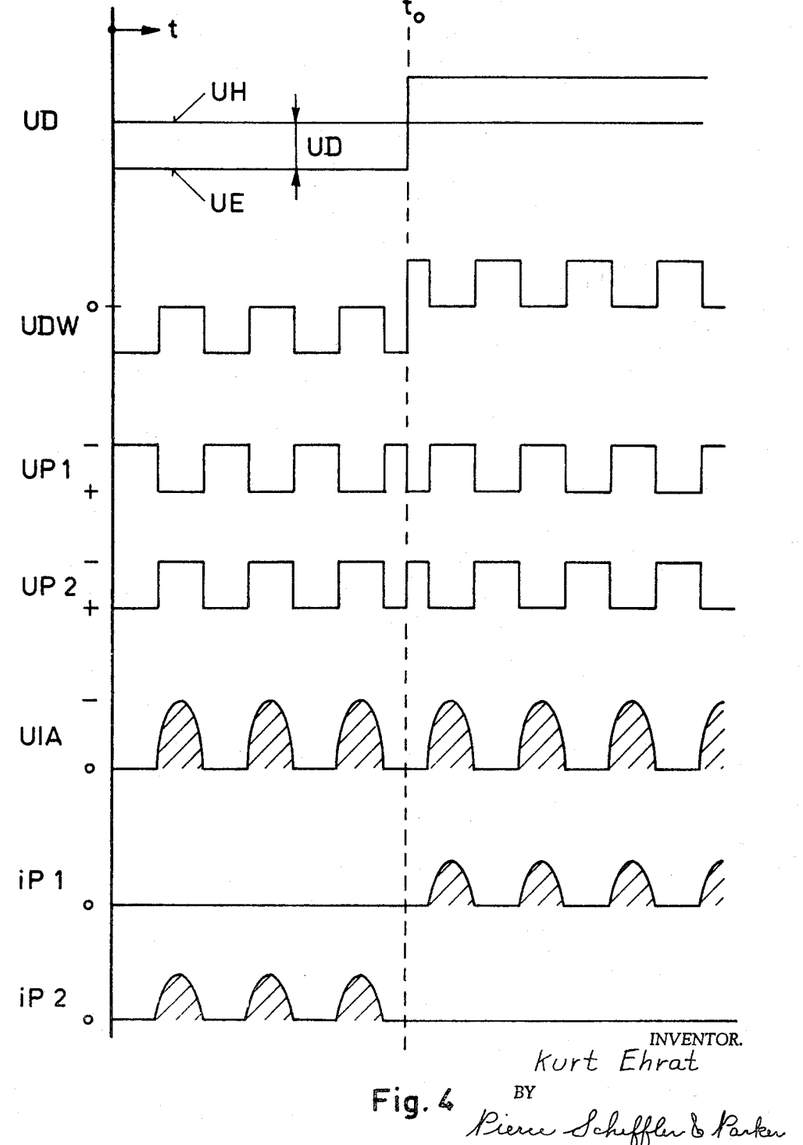
FIGURE 4 shows the time pattern of the voltages and currents governing the control of the indicator switching mechanisms in the apparatus shown in FIGURE 1 with each of the two polarities of the differential voltage.

This can be seen easily in FIGURE 4, in which the time curve of the voltages and impulses plotted against the time $t$ is shown. The amplitudes shown are not true to scale.

It is assumed that the auxiliary voltage UH is constant and the input voltage UE is smaller up to the point of time $t_0$, and greater than the auxiliary voltage from the point of time $t_0$ onwards. The differential voltage UD has thus the one polarity up to the point of time $t_0$ and thereafter the other polarity. In the second line the converted differential alternating current voltage UDW is shown, the voltage level indicated by 0 corresponding to the constant auxiliary voltage. In the third and fourth lines the converted and amplitude-limited differential alternating current voltages UP1 and UP2 are shown, the voltages being of opposite phase. The fifth line shows the impulse voltage UIA of the indication impulses and the sixth line the currents iP1 of the indication impulses through the forward running magnets of the indicator switching mechanisms and the first polarity gate PT1, while the seventh line shows the currents iP2 of the indication impulses through the reverse running magnets of the indicator switching mechanisms and through the second polarity gate PT2.

For the period of time before $t_0$, during which UE is smaller than UH and UD has a determined polarity, UP1 is opposite in phase and UP2 is in phase with UIA, the polarity gate PT2 is open and the indication impulse currents iP2 flow so that the indication impulses energise the reverse running magnets of the indicator switching mechanisms, whereby the auxiliary voltage UH is lowered, that is to say the input voltage UE is equalled.

For the period of time after $t_0$, during which UE is greater than UH and UD has the other polarity, UP1 is in phase and UP2 opposite in phase to U1A, the polarity gate PT1 is open and the indication impulse currents $iP1$ flow so that the indication impulses energise the forward running magnets of the indicator switching mechanisms, whereby the auxiliary voltage UH is increased and again the input voltage UE is equalled.

The abovementioned amplitude limitation of the amplified differential alternating current voltage is brought about by a negative feed-back, occurring spontaneously at a determined positive and at a determined negative maximum amplitude of the differential alternating current voltage, from the output to the input of the amplifier 10. The voltage UP1 is opposite in phase to the voltage connected to the amplifier input E, and the direct current potential of E and UP1 is equal.

If, at the positive maximum amplitude, the voltage UP1 is more positive than the input E by more than the Zener voltage of a Zener diode ZD1, intense feed-back occurs spontaneously through a diode D1, whereby the potential of E is maintained and the voltage UP1 is limited.

With negative maximum voltage, analogous spontaneously occurring negative feed-back occurs through an inversely poled Zener diode ZD2 and a diode D2.

This type of amplitude limitation has the object of so controlling the working point at the input E of the amplifier through the output voltage that the amplifier always remains open for the alternating current amplification, even in the case of direct current voltage jumps of UDW (before the capacitor C1), and that the amplifier will not be temporarily blocked by the working point displacements emanating from the direct current voltage jumps.

In order to permit the rapid change of charge of the capacitor C1 which is necessary for this type of amplitude limitation, the resistances R1, R2, and R3 of the voltage divider must be relatively small. In order to avoid loading the input voltage UE and the auxiliary voltage UH through these resistances, a cathode follower or emitter follower amplifier can be interposed between the vibrator contact and the voltage divider.

Figure 3:
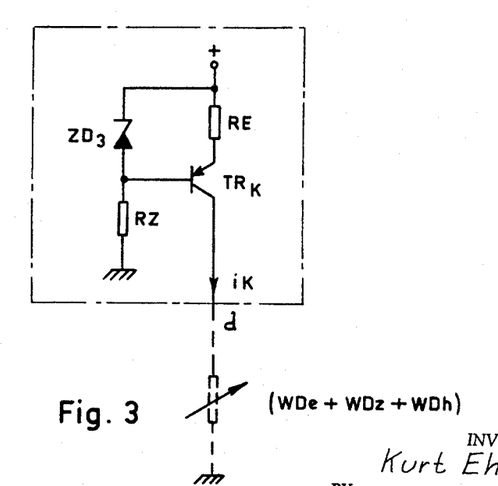
FIGURE 3 is another detail of the circuit arrangement.

The constant current $iK$ for feeding the resistance decades is supplied by a constant current source SQ1, a simple type of which is illustrated in FIGURE 3. The voltage through a resistance RE is kept practically constant through the action of a Zener diode ZD3 so that the current in the resistance RE is also practically constant and, since the base current of a transistor $TR_k$ is small, practically equal to the current $iK$, which serves to feed the resistance decades (WDe+WDz+WDk). For higher requirements in respect of current constancy, any of the known circuit arrangements for constant current sources can be used.

The constant current source SQ1 is used when the input voltage UE is positive to earth. For a negative input voltage, the current $iK$ (with reversal of the current direction) is supplied through a constant current source SQ2, by switching over a contact $pw3$. The constant current source SQ2 can be constructed similarly to that illustrated in FIGURE 3, while however the feed voltage is negative and the Zener diode is reversed in polarity and an n-p-n transistor is used.

As already mentioned, not only the polarity but also the amplitude of the differential voltage is used for regulating the auxiliary voltage. The object of this amplitude control is to shorten the total adjustment time of all the indicator switching mechanisms. When the amplitude of the differential voltage UD is large, i.e. when a large voltage difference between the input voltage UE and the auxiliary voltage UH exists, only the indicator switching mechanisms of the higher decimal places should be adjusted in the described manner by the indication impulses, and as the amplitude of the differential voltage becomes smaller the indicator switching mechanisms of the lower and lowest decimal places in succession. The control of the feeding of the indication impulses to the different indicator switching mechanisms in dependence on the amplitude of the differential voltage is effected by the position selector switching mechanism 11. This position selector switching mechanism is constructed similarly or identically to the described indicator switching mechanism, but needs no figure rollers. The position selector switching mechanism rotor which can be turned in the forward and reverse direction consists in the example illustrated in FIGURE 1 of the rotor shaft 39 rotatably mounted in bearings 44 and 45, ratchet wheels 42 for the drive in the forward direction (V) and 43 for the drive in the reverse direction (R), the switch arm 7 and slip-ring 8 of the voltage divider switch 6, and the switch arm 38 and slip-ring 37 of the position switch 35. The position switches and voltage divider switches with their rotating arms and slip-rings shown in FIGURE 1 could also be replaced by cam contact switching mechanisms having the same electrical action. In the case where a forward running magnet SV of the position selector switching mechanism is impulse-energised, the rotor is turned in the forward direction, and when a reverse running magnet SR of the position selector switching mechanism is impulse-energised, the rotor is turned in the reverse direction. The impulse-energisation is effected through the position selector impulses from the source of impulse voltage illustrated in FIGURE 1 by UIS. By means of the turning of the rotor one step in the forward direction the indication impulses are fed to the indicator switching mechanism of the next higher decimal place through the switching-over of the position switch 35, and through the switching of the rotor by one step in the reverse direction the indication impulses are fed to the indicator switching mechanism of the next lower decimal place through the switching-over of the position switch 35.

As already mentioned, the switching of the position selector switching mechanism in the forward or reverse direction is effected with the aid of amplitude-sensitive and other switching means through the action of the amplitude of the differential voltage, in such a manner that when the latter exceeds an upper voltage limit the forward running magnet is energised and when it falls below a lower voltage limit the reverse running magnet of the position selector switching mechanism is energised.

The control of the position selector switching mechanism by the amplitude of the differential voltage will now be explained with reference to the embodiment illustrated in FIGURE 1. The impulse frequency of the position selector impulses (impulse feed voltage UIS) is equal to the frequency of the vibrator alternating current and thus equal to the frequency of the differential alternating current voltage, and is in phase or opposite in phase thereto. Similarly to the indication impulses, the position selector impulses are controlled by AND-gate circuits formed by means of transistors and designated as amplitude gates, a first amplitude gate AT1 controlling the position selector impulses $iA1$ to the forward running magnet SV, and a second amplitude gate AT2 controlling the position selector impulses $iA2$ to the reverse running magnet SR. The amplitude gates are controlled by the amplitudes of the amplified differential alternating current voltages UP1 and UP2, with the use of differentiator circuits, full-wave rectifier circuit arrangements, and pre-stressed monostable multi-vibrators as amplitude-sensitive and other switching means.

Figure 5:
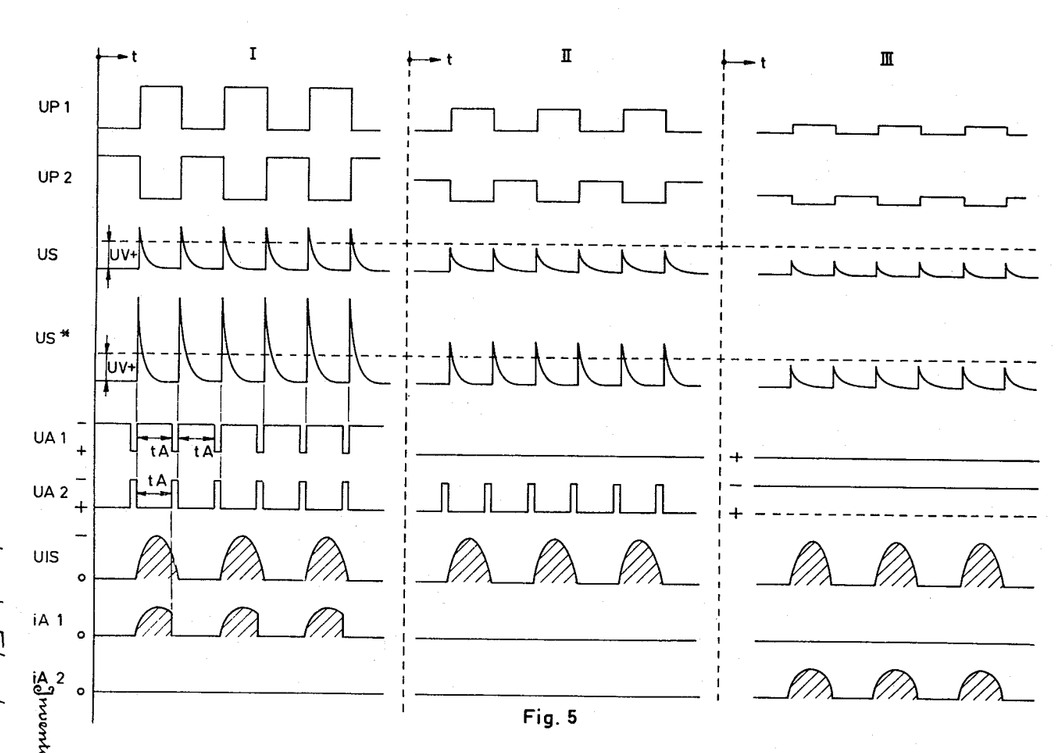
FIGURE 5 shows the time pattern of the voltages and currents governing the control of the position selector switching mechanism of the apparatus shown in FIGURE 1, with three different amplitudes of the amplified differential alternating current voltage.

The mode of operation can easily be seen from FIGURE 5, which shows the time curves of different impulse voltages and impulse currents (which are likewise shown in the diagram in FIGURE 1), namely in column I with a large differential voltage or differential alternating current voltage, in column II with a medium and in column III with a small differential voltage or differential alternating current voltage.

The different voltage and current programmes will first be followed with the aid of column I. The amplified rectangular differential alternating current voltages UP1 and UP2 which are opposite in phase to one another are differentiated by the action of capacitors C4 and C5, whereby peak impulses are produced, which are converted with the aid of rectifiers D3 and D4 and their associated resistances which are connected in parallel, into peak impulses US, which represent the differentiated full-wave rectified voltage of the amplified differential alternating current voltage. The height of the peaks of the voltages US corresponds to the height of the voltage jumps of the voltages UP1 and UP2, the impulse frequency of the impulses US being twice the frequency of the differential alternating current voltage.

The peak impulse voltage US is fed on the one hand direct to the input $a$ of a monostable multi-vibrator MM1, and on the other hand is amplified about ten times by an amplifier 46 and is fed as a peak impulse voltage US* to the input $a$ of the second monostable multi-vibrator MM2.

Figure 2:
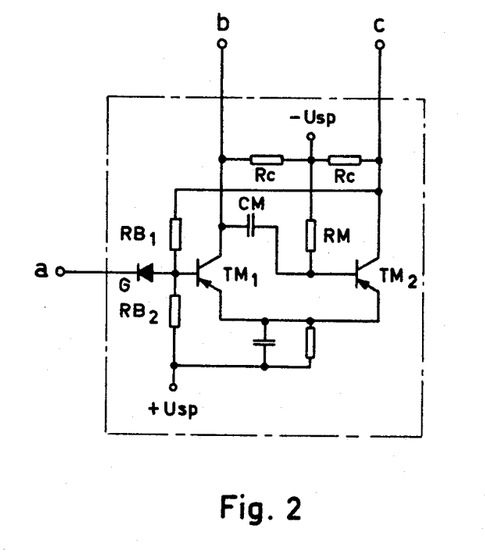
FIGURE 2 is a detail of the circuit shown in the wiring diagram of FIGURE 1.

The circuit arrangement of such a monostable multi-vibrator which has transistors TM1 and TM2 is indicated in FIGURE 2 and the mode of operation is generally known and will therefore not be described in all details. The multi-vibrator has the input terminal $a$, an output terminal $b$, and a second output terminal $c$. In the stationary, unresponded condition, in which no impulses reach the input terminal $a$, the transistor TM2 is conductive, the transistor TM1 is blocked, the output terminal $b$ is negative, and the output terminal $c$ is positive.

The monostable multi-vibrator is caused to "tip" or respond when a negative peak impulse is applied to the input terminal $a$ when the multi-vibrator is in the responded condition, the transistor TM1 conducts and the transistor TM2 is blocked. During the duration of the responded condition, the output terminal $b$ is thus positive and the output terminal $c$ is negative. The response time $tA$ is dependent on a capacitor CM and resistance RM (FIGURE 2), and amounts to about $tA=0.7$ CM.RM. At the end of the response time the multi-vibrator "tips" back to its original stationary condition.

The inputs $a$ of both monostable multi-vibrators receive not only the peak impulse voltage US or US* but also a positive bias voltage UV+, the peak impulse voltages US and US* being negative, and being capable of causing the multi-vibrators to respond only when their amplitude exceeds the magnitude of the positive bias voltage UV+. In column I of FIGURE 5, the third line shows the peak impulse voltage US and bias voltage UV+. The peak impulses exceed the bias voltage, and the monostable multi-vibrator MM1 is caused to respond at every peak impulse. The voltage UA1 at the output terminal $c$, which is connected to the amplitude gate AT1, is practically continuously negative, so that the amplitude gate AT1 is always open thus allowing the passage of the position selector impulses $iA1$ to the forward running magnet SV. The impulse-energisation of the forward running magnet switches the position selector switching mechanism 11 in the forward direction, and the indication impulse feeding is switched over to a higher one of the position indicator switching mechanisms 14e, 14z and 14h. The voltage UA1 can be seen in the fifth line in FIGURE 5. The response time $tA$ of the monostable multi-vibrators MM1 and MM2 is so selected that tipping back into the stationary condition occurs on each occasion shortly before the arrival of the new peak impulse. In the seventh line in FIGURE 5 the feed voltage UIS of the position selector impulses through the first amplitude gate AT1 and the forward running magnet SV is shown.

The fourth line of the same column I of FIGURE 5 shows the peak impulse voltage US*, in accordance with amplitude but not accurately to scale. Since by virtue of the amplification in the amplifier 46 the peak impulse amplitude of US* is about ten times as great as that of US, under these amplitude conditions the bias UV+ is greatly exceeded by the peak impulses US*, and the second monostable multi-vibrator MM2 is also caused to respond continuously. In this case the voltage UA2 (line 6) of the output terminal $b$ is practically continuously positive, and the second amplitude gate AT2 is continuously blocked so that the reverse running magnet SR is not energised by any position selector impulses, $iA2$ being zero, as can be seen from the ninth line.

In column II of FIGURE 5 the same voltages and currents are shown, but for medium amplitudes of the differential alternating current voltage. The peak impulse voltage US no longer exceeds the bias voltage UV+, the monostable multi-vibrator MM1 does not respond, its voltage UA1 at the output terminal $c$ is continuously positive, and the amplitude gate AT1 is continuously blocked.

The amplified peak impulse voltage US* however still exceeds the bias voltage UV+, the multi-vibrator MM2 responds continuously, its voltage UA2 at the output terminal $b$ is practically continuously positive, and the second amplitude gate AT2 is likewise continuously blocked. With these "medium" amplitudes of the differential voltage, no position selector impulses reach the position selector switching mechanism 11 and the latter is stationary.

If the differential voltage and hence also the differential alternating current are still smaller, the conditions shown in column III in FIGURE 5 obtain.

The voltages are so small that neither the peak impulses US nor the peak impulses US* exceed the bias voltage UV+, and thus both monostable multi-vibrators remain in the unresponded condition. The voltage UA1 at the output terminal $c$ of the multi-vibrator MM1 remains continuously positive and the amplitude gate AT1 is blocked. The voltage UA2 at the output terminal $b$ of the multi-vibrator MM2 remains continuously negative and the amplitude gate AT2 is continuously opened. The impulse current $iA2$ can flow so that the indication impulses energise the reverse running magnet SR of the position selector switching mechanism, whereby its rotor is turned in the reverse direction and the feeding of indication impulses is switched over to a lower one of the place indicator switching mechanisms 14e, 14z and 14h.

To sum up, the action is such that when the peak impulses US exceed an upper limit voltage, the bias voltage UV+, the first monostable multi-vibrator MM1 is caused to respond, the first amplitude gate AT1 is opened, and the position selector impulses $iA1$ reach the forward running magnet SV of the position selector switching mechanism 11, and such that in addition the amplified peak impulses normally cause the second monostable multi-vibrator MM2 to respond continuously, while the second amplitude gate AT2 is continuously blocked, but that when the peak impulses US* are below a lower limit voltage, again the bias voltage UV+, the second monostable multi-vibrator MM2 no longer responds, the second amplitude gate is opened, and the position selection impulses $iA2$ reach the reverse running magnet SR of the position selector switching mechanism. Through this amplitude control, in the case of high differential voltages, the "coarse stage" partial voltages of the indicator switching mechanisms of the higher decimal places are first regulated and for reducing differential voltages the "fine stage" partial voltages of the low place indicator switching mechanisms are regulated.

Since the partial voltage decade values of the indicator switching mechanisms increase or decrease from decimal place to decimal place by the factor ten, the ratio of the differential voltage at which the upper voltage limit is exceeded to the differential voltage at which the lower voltage limit is understepped, must be greater than ten.

For the same reason, the input voltage divider with the resistances R1, R2, R3 has a voltage divider ratio of 1:10 from stage to stage. The voltage divider is controlled by the voltage divider switch 6 synchronously with the position switch 35 by the position selector switching mechanism, in such a manner that for example in the case of high differential voltages, at which the indication impulses are taken to a high place indicator switching mechanism, the voltage divider greatly reduces the differential voltage, namely by the factor ten from stage to stage. Through the voltage divider switch coupled to the position switch the effect is achieved that for all switch positions of the position selector switching mechanism the control of the amplifier remains approximately constant.

In order that after alignment of the auxiliary voltage has been effected by means of which the position switch on the feed line $e$ stands at the lowest place indicator switching mechanism 14$e$, the said indicator switching mechanism will not be continuously moved, a rest position $r$ is provided on the position selector switching mechanism, this position of rest being assumed by the position selector switching mechanism when the differential voltage is below a lowest voltage limit. In this position of rest no indicator switching mechanism is connected in the circuit. This is particularly advantageous, because the indicator switching mechanisms are no longer moved after adjustment has been made at constant input voltage, so that the wear on the switching mechanisms is minimised.

In order to indicate positive and negative input voltages UE, the apparatus is provided with a polarity reversal arrangement. This polarity reversal arrangement consists of a bi-stable storage circuit arrangement BS, which is controlled through the tens transfer contacts ZR$h$ for reverse running of the indicator switching mechanism of the highest decimal place, which is referred to as the polarity change contact. These contacts are closed in the switch position 0, and the next following indication impulse, which reaches the reverse running magnet of the highest place indicator switching mechanism (the polarity gate PT2 being open) must effect the polarity change, since otherwise this indicator switching mechanism turns back from the position 0 into the position 9, which is impermissible. Through the closed polarity change contacts ZR$h$, a rectifier 47, and a contact $pw1$ this indication impulse effects the operation of a relay X, which for example is of the low ohm type, and through connection in parallel prevents the operation of the reverse running magnets. A relay PW pulls up through the closing of a contact $x$, and holds itself through a contact $pw2$. The auxiliary voltage current source is switched over by its contact $pw3$ from the positive constant current source SQ1 to the negative constant current source SQ2 through the pulling up of the relay PW, whereby the auxiliary voltage is likewise made negative. In addition, through the contacts $pw4$ and $pw5$, the voltages UP1 and UP2 in front of the polarity gates are transposed and finally also switched over through the contact $pw1$ from the relay X to a relay Y. The arrangement, which in the position illustrated in FIGURE 1 was suitable for representing positive input voltages, is now switched over through the pulling up of the relay PW for representing negative impulse voltages. The next indication impulse which reaches the bi-stable storage circuit arrangement BS and which attempts to turn the high position indicator switching mechanism still further back from the switch position 0, effects the operation of the relay Y, whereby through the opening of a contact $y$ the relay PW is caused to drop again and restores the original condition suitable for positive input voltages.

In order to mark the polarity, an indicator 48 furnished with the signs + and − is fixed on the relay armature of the relay PW, the sign + being for example visible when the relay PW has dropped and the sign − being visible when it has risen. The bi-stable storage circuit arrangement BS, which in the example illustrated in FIGURE 1 is in the form of a relay circuit arrangement, could also be purely electronic. In addition, instead of the auxiliary voltage the input voltage could be pole-reversed for the polarity change.

The impulse voltages of the indication impulses UIA and of the position selector impulses are advantageously taken from an alternating current voltage source through half-wave rectification, the alternating current voltage source also supplying the feed voltage UZ for the vibrator. The solution according to which the lighting mains voltage UN serves as alternating current voltage source through a mains transformer 49 (FIGURE 1) is particularly simple and advantageous. In the example illustrated in FIGURE 1 the point UNZ on the mains transformer must then be connected to the vibrator input UZ, and the point UIN on the mains transformer to the feed points UIA of the indication impulses and UIS of the position selection impulses. The driving power of the switching mechanisms is thus taken direct from the mains transformer and not from a direct current voltage.

The AND-gate circuit arrangements could be constructed with controlled rectifiers instead of with transistors. The selected control of the switching mechanisms with gate circuits formed of transistors or control rectifiers affords the great advantage that the power loss in the gates is practically zero. For the convenient remote transmission of the switch positions of the indicator switching mechanisms, that is to say of the coded digital magnitude, the indicator switching mechanisms can contain additional switch contacts which together give switch programmes by which each of the ten switch positions of an indicator switching mechanism is determined in any desired code form and can be transmitted electrically to a distance. These switch contacts are indicated in FIGURE 1 for example by the contacts PR$e$, PR$z$ and PR$h$. For the purpose of forming a switch programme, ten cam contacts can for example be used, one of which is in each case closed in one of the ten switch positions. In addition, a binary coded decimal switch programme could also be jointly produced for the ten switch positions with four different cam contacts which are controlled by four suitable cam discs.

The partial voltage decades could also be represented in other ways than by means of resistance decades.

The analogue magnitudes to be coded can also be resistances of currents which are converted into a voltage UE by suitable steps.

The vibrator 3, which in the embodiment illustrated in FIGURE 1 is shown as a contact vibrator, could also be replaced by a vibrator of a different type, for example a transistor vibrator.

Instead of being of single-pole construction as in the example illustrated in FIGURE 1, the position switch 35 could also be of two-pole construction, in which case switch arms 38 and contacts $h$, $z$, and $e$ of the position switch would have to be duplicated, and from these contacts a special line would have to lead to the terminals 34 of each forward running magnet and of each reverse running magnet, the rectifiers 31 and 33 being eliminated.

In this specification the description has been confined to the digital coding of analogue quantities as multi-place figures in the decimal system using decade rollers in the indicator switching mechanisms and "tens transfer" contacts. It is to be appreciated that the apparatus may be adapted for other systems, such as, for example, the duodecimal system, and in this specification the terms "decimal system," "decade" and "tens transfer" are accordingly to be construed as being applicable to and covering systems other than the purely decimal system.

I claim:

1. Apparatus for the digital coding of analogue quantities as multi-place figures in the decimal system, comprising a plurality of electromagnetic decade indicator switching mechanisms, one for each place of the multi-place figure, an indicating rotor to each indicator switching mechanism, a forward running electromagnet to each indicator switching mechanism, means operable by said electromagnet to drive its respective rotor in a forward direction, a reverse running electromagnet to each indicator switching mechanism, means operable by said reverse running electromagnet to drive its respective rotor in the reverse direction, a partial voltage resistance decade to each indicator switching mechanism, each such resistance decade comprising a decade of resistance each provided with a switch contact, the ten absolute values of the resistances of the partial voltage resistances decade of the indicator switching mechanism allocated to one decimal place being ten times as great as the corresponing ten absolute values of the resistances of the partial voltage resistance decade of the indicator switching mechanism allocated to the next lower decimal place, a decade switch to each indicator switching mechanism and operable to contact a switch contact of the resistance decade, tens transfer contacts to each indicator switching mechanism, means operable by the rotor of each indicator switching mechanism to operate the tens transfer contacts associated therewith, a position selector switching mechanism, a rotor to said position selector switching mechanism, a forward running electromagnet to said position selector switching mechanism, means operable by the latter electromagnet to drive the rotor in a forward direction, a reverse running electromagnet to said position selector switching mechanism, means operable by the latter electromagnet to drive the rotor in a reverse direction, a position switch operable by the rotor of said position selector switching mechanism, a source of indicator impulses, line means connecting said position switch to each of said indicator switching mechanisms whereby said indicator impulses can be fed to any one of said indicator switching mechanisms, a source of position selector impulses, amplitude-sensitive switching means operatively controlling the electromagnets of the position selector switching mechanism to permit position selector impulses to be fed to said electromagnets, a constant limit voltage source associated with said amplitude-sensitive switching means, a source for the analogue quantity to be compared in the form of a direct current input voltage source, a source of direct current, means connecting said direct current source through the operative resistances of the resistance decades of all the indicator switching mechanisms so as to generate an auxiliary voltage, means for generating a differential voltage between said input voltage and said auxiliary voltage produced in the apparatus, a voltage divider switch operable by the rotor of said position selector switching mechanism, line means feeding the differential voltage to one side of said voltage divider switch, and polarity-sensitive switching means connected between the other side of said voltage divider switch and the electromagnets of the indicator switching mechanisms to feed indication impulses to said electromagnets to operate the latter, the arrangement being such that the differential voltage is used to control the indicator switching mechanisms each of which controls a voltage fraction of the auxiliary voltage in a manner such that the magnitude of the auxiliary voltage as the sum of all the partial voltages after the control of the indicator switching mechanisms, effected by the differential voltage, becomes practically equal to the input voltage and the differential voltage becomes practically equal to zero, whereby the switch positions of all the indicator switching mechanisms represent the input voltage as a multi-place figure in digital form, and being such that the indicator switching mechanisms are controlled through the differential voltage owing to the fact that in each case indicator impulses are supplied to an indicator switching mechanism selected by means of the position switch of the position selector switching mechanism, these indicator impulses being controlled by the differential voltage with the said of the polarity-sensitive switching means in such a manner that, depending on the polarity of the differential voltage, they energise the appropriate electromagnet of the respective indicator switching mechanism and thus drive the indicator switching mechanism rotor in the one direction depending on the polarity of the differential voltage, while in addition this selected indicator switching mechanism together with indicator switching mechanisms of all higher decimal places form a decade impulse meter running forwards and backwards, in which the tens transfers of the lower to the next higher decimal places are effected by the tens transfer contacts operated by the indicator switching mechanism rotor, while the switching of the position selector switching mechanism rotor by one step in the forward direction feeds the indication impulses through the switching-over of the position switch to the indicator switching mechanism of the next higher decimal place, and the switching of the rotor by one step in the reverse direction feeds the indication impulses through the switching-over of the position switch to the indicator switching mechanism of the next lower decimal place, the switching of the position selector switching mechanism rotor in the appropriate direction in dependence upon the amplitude of the differential voltage being controlled by the position selector impulses with the aid of the amplitude-sensitive switching means in such a manner that, when the amplitude of the differential voltage of a top voltage limit is exceeded, at least one position selector impulse reaches the forward running magnet of the position selector switching mechanism and switches the latter in the forward direction and through the position switch switches over the feeding of the indication impulses from the indicator switching mechanism of one decimal place to the indicator switching mechanism of the next higher decimal place, and that, when the differential voltage falls below a lower voltage limit, at least one position selector impulse reaches the reverse running magnet of the position selector switching mechanism and switches the same in the reverse direction, and through the position switch switches over the feeding of the indication impulses from the indicator switching mechanism of one decimal place to that of the next lower decimal place.

2. The apparatus of claim 1, and further comprising a vibrator, an alternating current source controlling said vibrator, the vibrator converting the differential voltage into a differential alternating current voltage the frequency of which is the frequency of the alternating current source, a converter, and switching means, the differential alternating current voltage being amplified in the converter and serving to control the indicator switching mechanisms and the position selector switching mechanism through the switching means.

3. The apparatus of claim 2, wherein the impulse frequency of the indication impulses is equal to the frequency of the alternating current controlling the vibrator, and the indication impulses are in phase with the differential alternating current voltage for a determined polarity of the differential voltage and opposite in phase for the other polarity of the differential voltage, so that phase-comparing switching means can serve as the polarity-sensitive switching means.

4. The apparatus of claim 2, wherein the impulse frequency of the indication impulses and the frequency of the alternating current controlling the vibrator are equal to the frequency of the lighting mains (for example 50 c.p.s.)

5. The apparatus of claim 4, wherein the indication impulses are obtained from the lighting mains through a mains transformer and a half-wave rectifier and the alternating current controlling the vibrator is obtained from the lighting mains through the mains transformer.

6. The apparatus of claim 2, wherein the impulse frequency of the position selection impulses is equal to the frequency of the lighting mains and the position selection impulses are obtained from the lighting mains through a mains transformer and a half-wave rectifier.

7. The apparatus of claim 1, wherein the ratio of the differential voltage at which the upper voltage limit is exceeded to the differential voltage at which the lower voltage limit is not reached is greater than ten, and wherein the multi-stage voltage divider is disposed at the input of an amplifier and is switched by the voltage divider switch of the position selector switching mechanism in such a manner that on the switching of the position selector switching mechanism in the forward direction the differential alternating current voltage from one switching stage to the next is reduced by the factor ten.

8. The apparatus of claim 7, wherein the amplifier is limited in amplitude by a negative feed-back from the output to the input of the amplifier occurring spontaneously at a determined positive and a determined negative maximum amplitude of the differential alternating current voltage.

9. The apparatus of claim 8, wherein the negative feedback spontaneously occurring at the positive and at the negative maximum amplitude of the differential alternating current voltage is effected by one Zener diode, connected to the amplifier output, for each of the two amplitudes, these Zener diodes being connected through respective rectifiers to the amplifier input.

10. The apparatus of claim 1, wherein a partial voltage decade consists of a resistance decade traversed by a constant current of a constant current source, the resistance of which through a decade switch of the appertaining indicator switching mechanism, on passing through its ten switch positions, passes through the 10 ratio values 0, 1, 2 . . . 9, the voltage over one resistance decade being a partial voltage.

11. The apparatus of claim 10, wherein a resistance decade is allocated to each indicator switching mechanism associated with a decimal place of the multi-place number to be coded, the resistance values of the indicator switching mechanism of a determined decimal place being ten times as great as those of the indicator switching mechanism of the next lower decimal place, and wherein all resistance decades are connected in series and are traversed by the same constant current of a constant current source, the voltage through all the resistance decades as a sum of all the partial voltages being the auxiliary voltage.

12. The apparatus of claim 1, wherein the position selector switching mechanism has at least one switch position more than the number of the indicator switching mechanisms and on the lowering of the differential voltage below a lowest limit value the position switch of the position selector switching mechanism of the indicator switching mechanism of the lowest decimal place switches over to an inoperative switch position in which none of the indicator switching mechanisms is connected.

13. The apparatus of claim 1, wherein the indicator switching mechanisms are so arranged that the switching of their rotors is effected in the current-less phase of the indication impulses through the dropping movement of magnet armatures of the forward running or reverse running electromagnets.

14. The apparatus of claim 1, wherein a transistor amplifier is provided for amplifying the differential voltage.

15. The apparatus of claim 1, wherein the indicator switching mechanisms are provided with indicator figure rollers and printing figure rollers mechanically connected to the indicator switching mechanism rotor, the said rollers respectively indicating and printing the switch positions by means of the figures 0 to 9, and wherein the indicator switching mechanisms have a small dimension transversely to the said figures, the indicator switching mechanisms being spatially disposed side-by-side in such a manner that the figure shown by all the indicator figure rollers together and the figure printed by all the printing figure rollers together can easily be read as multi-place figures.

16. The apparatus of claim 15, wherein each indicator switching mechanism has in addition to the switch contacts for controlling the partial voltage decades and in addition to the tens transfer contacts, other switch contacts which together control a least one switching programme, by which each of the ten switch positions of an indicator switching mechanism is fixed in any desired code form and can be electrically transmitted to a distance.

17. The apparatus of claim 16, wherein the switch contacts which together control the switch programme are ten contacts, one of which is in each case operated in each one of the ten switch positions of the indicator switching mechanism.

18. The apparatus of claim 16, wherein the switch contacts which together control the switch programme are four different contacts, the operating programmes of which, depending on the ten switch positions, together yield a binary coded decimal programme.

19. Apparatus for the digital coding of analogue quantities as multi-place figures in the decimal system, comprising a plurality of electromagnetic decade indicator switching mechanisms, one for each place of the multi-place figure; an indicating rotor to each indicator switching mechanism; a forward running electromagnet to each indicator switching mechanism; means operable by said electromagnet to drive its respective rotor in a forward direction; a reverse running electromagnet to each indicator switching mechanism; means operable by said reverse running electromagnet to drive its respective rotor in the reverse direction; a partial voltage resistance decade to each indicator switching mechanism, each such resistance decade comprising a decade of resistances each provided with a switch contact, the ten absolute values of the resistances of the partial voltage resistance decade of the indicator switching mechanism allocated to one decimal place being ten times as great as the corresponding ten absolute values of the resistances of the partial voltage resistance decade of the indicator switching mechanism allocated to the next lower decimal place; a decade switch to each indicator switching mechanism and operable to contact a switch contact of the resistance decade; tens transfer contacts to each indicator switching mechanism; means operable by the rotor of each indicator switching mechanism to operate the tens transfer contacts associated therewith; a position selector switching mechanism; a rotor to said position selector switching mechanism; a forward running electromagnet to said position selector switching mechanism; means operable by the latter electromagnet to drive the rotor in a forward direction; a reverse running electromagnet to said position selector switching mechanism; means operable by the latter electromagnet to drive the rotor in a reverse direction; a position switch operable by the rotor of said position selector switching mechanism; a source of indicator impulses; line means connecting said position switch to each of said indicator switching mechanisms whereby said indicator impulses can be fed to any one of said indicator switching mechanisms; a source of position selector impulses; a source for the analogue quantity to be compared in the form of a direct current input voltage source; a source of direct current; means connecting said direct current source through the operative resistances of the resistance decades of all the indicator switching mechanisms so as to generate an auxiliary voltage; means for generating a differential voltage between said input voltage and said auxiliary voltage produced in the apparatus; two AND-gate circuit arrangements comprising amplitude-sensitive and other switching means for controlling the position selector switching mechanism through the amplitude of the differential voltage; a constant limit voltage source associated with the latter means, the position selector impulses being arranged to pass through a first AND-gate circuit arrangement, constituting a first amplitude gate, to the forward running electromagnet of 10 position selector switching mechanism, and to pass through the second AND-gate circuit arrangement, constituting a second amplitude gate, to the reverse running electromagnet of the position selector switching mechanism; the first amplitude gate being opened through the amplified differential alternating current voltage with the aid of amplitude-sensitive and other switching means for the position selector impulses, as soon as the differential voltage exceeds the upper voltage limit, and the second amplitude gate being opened through the amplified differential alternating current voltage with the aid of amplitude-sensitive and other switching means for the position selector impulses as soon as the differential voltage falls below the lower voltage limit; a voltage divider switch operable by the rotor of said position selector switching mechanism; line means feeding the differential voltage to one side of said voltage divider switch; two further AND-gates comprising polarity-sensitive switching means; and a phase reversal circuit operatively connected to said polarity sensitive AND-gates, the further AND-gates and phase reversal circuit controlling the indicator switching mechanisms through the polarity of the differential voltage, the indication impulses being fed through a first further AND-gate circuit arrangement, constituting a first polarity gate, to the forward running electromagnets of the indicator switching mechanisms, and through the second further AND-gate circuit arrangement, constituting a second polarity gate, to the reverse running electromagnets of the indicator switching mechanisms, whereby the amplified differential alternating current voltage is fed to the first polarity gate and the amplified differential alternating current voltage is likewise fed to the second polarity gate but with a phase displaced by 180° in the phase reversal circuit arrangement, so that for a determined polarity of the differential voltage only the first polarity gate is opened and the indication impulses reach the forward running magnets, and for the other polarity of the differential voltage only the second polarity gate is opened and the indication impulses reach the reverse running magnets.

20. The apparatus of claim 19, and further comprising a vibrator, an alternating current source controlling said vibrator, the vibrator converting the differential voltage into a differential alternating current voltage the frequency of which is the frequency of the alternating current source, a converter, and switching means, the differential alternating current voltage being amplified in the converter and serving to control the indicator switching mechanisms and the position selector switching mechanism through the switching means.

21. The apparatus of claim 20, wherein the impulse frequency of the position selection impulses is equal to the frequency of the alternating current controlling the vibrator.

22. The apparatus of claim 19, wherein the amplitude-sensitive and other switching means consist of a differentiating circuit arrangement for obtaining peak impulses from the rectangular differential alternating current voltage, a full-wave rectifier circuit arrangement, from which rectified peak impulses are obtained at twice the frequency of the differential alternating current voltage, and two monostable multivibrators, the peak impulses on the one hand causing the first monostable multi-vibrator to respond when an upper voltage limit is exceeded, and the monostable multi-vibrator in the responded condition opening the first amplitude gate, whereby the position selection impulses reach the forward running magnet of the position selector switching mechanism, while on the other hand the peak impulses normally cause the second monostable multi-vibrator to respond and block the second amplitude gate, while however when the peak impulses fall below a lower voltage limit the second monostable multi-vibrator no longer responds and thereby opens the second amplitude gate, whereby the position selection impulses reach the reverse running magnet of the position selector switching mechanism.

23. The apparatus of claim 19, wherein in the decade impulse counting mechanism running forwards and backwards and formed of the indicator switching mechanisms, the first current feeds of the forward running magnets of all the indicator switching mechanisms are connected together and to the first polarity gate, and the first current feeds of the reverse running magnets of all the indicator switching mechanisms are connected together and to the second polarity gate, and wherein the second current feeds of the forward running and reverse running magnets of the same indicator switching mechanism are connected to at least one switch contact of the position switch controlled by the position selector switching mechanism, and the corresponding current feeds of every other indicator switching mechanism are connected to in each case at least one further switch contact of the position switch controlled by the position selector switching mechanism, through which switch contacts the indication impulses are fed to the indicator switching mechanism.

24. The apparatus of claim 23, wherein said second current feeds and said corresponding current feeds are connected through rectifiers to said switch contacts.

25. The apparatus of claim 23, wherein the second current feed of the forward running magnet of the indicator switching mechanism of a determined decimal place is connected through a rectifier and the tens transfer contacts, for effecting the tens transfer when running in the forward direction of the same indicator switching mechanism which contacts are closed only in the switch position 9, to the second current feed of the forward running magnet of the indicator switching mechanism of the next higher decimal place, the rectifier allowing the indication impulses to pass in the direction from the lower place indicator switching mechanism to the higher place indicator switching mechanism.

26. The apparatus of claim 23, wherein the second current feed of the reverse running magnet of the indicator switching mechanism of a determined decimal place is connected through a rectifier and the tens transfer contacts for effecting the tens transfer for running in the reverse direction of the same indicator switching mechanism which contacts are closed only in the switch position zero, to the second current feed of the reverse running magnet of the indicator switching mechanism of the next higher decimal place, the rectifier allowing the indication impulses to pass in the direction from the lower place indicator switching mechanism to the higher place indicator switching mechanism.

27. The apparatus of claim 26, wherein the second current feed of the reverse running magnet of the indicator switching mechanism of the highest decimal place leads by way of a contact of the said switching mechanism, which is designated as the polarity change contact and which is closed in the switch position zero, to a bi-stable storage circuit arrangement which by every indication impulse arriving through the polarity change contact is transposed from one of the bi-stable switching conditions to the other.

28. The apparatus of claim 27, wherein the polarity of the auxiliary voltage is controlled by the bi-stable storage circuit arrangement, in such a manner that for one of the two switching conditions of the storage circuit arrangement the auxiliary voltage has a determined polarity, and for the other of the two switching conditions it has the opposite polarity.

29. The apparatus of claim 27, wherein the polarity of the auxiliary voltage is controlled by the bi-stable storage circuit arrangement, owing to the fact that for one of the two switching conditions of the storage circuit arrangement the resistance decades are traversed by the current of a constant current source of a determined current direction, and for the other of the two switching conditions by the current of a second constant current source of opposite current direction, in such a manner that on passing over from one switching condition to the other of the bi-stable storage circuit arrangement the polarity of the auxiliary voltage is reversed.

30. The apparatus of claim 27, wherein the input voltage is controlled by the bi-stable storage circuit arrangement in such a manner that for one of the two switching conditions of the storage circuit arrangement the input voltage is fed direct and for the other of the two switching conditions its polarity is reversed.

31. The apparatus of claim 27, wherein the bi-stable storage circuit arrangement is a relay circuit arrangement.

32. The apparatus of claim 27, wherein the bi-stable storage circuit arrangement on its passing from one switching condition to the other is arranged to transpose the phase of the differential alternating current voltage fed to the first polarity gate with the phase of the differential alternating current voltage fed to the second polarity gate.

33. The apparatus of claim 27, wherein the bi-stable storage circuit arrangement controls an indicator which for one of the bi-stable switching conditions indicates the polarity sign + and for the other indicates the polarity sign —.

34. The apparatus of claim 33, wherein the indicator is an electromagnet.

35. The apparatus of claim 19, wherein the AND-gate circuit arrangements are transistor circuit arrangements, while the indication impulses and the position selection impulses pass through the collector-emitter path of the transistors and the amplified differential alternating current voltage is passed direct or through switching means to the base of the transistors.

36. The apparatus of claim 19, wherein the AND-gate circuit arrangements are circuit arrangements with controlled rectifiers, the indication impulses and the position selection impulses passing through the rectifier path of the controlled rectifiers and the amplified differential alternating current voltage passing directly or through switching means to the control electrode of the controlled rectifiers.

37. The apparatus of claim 19, wherein the indication impulses and the position selection impulses are obtained direct from the lighting mains through a mains transformer and a half-wave rectifier, and the direct current feed voltage source of the apparatus has to supply little power.

No references cited.